United States Patent [19]

Hakamada et al.

[11] Patent Number: 4,591,914
[45] Date of Patent: May 27, 1986

[54] APPARATUS FOR CONTROLLING POWER SUPPLY TO ELECTRONIC CIRCUITRY

[75] Inventors: Kunio Hakamada, Tokyo; Satoshi Ishiguro; Hideo Wakabayashi, both of Kanagawa; Kiyoshi Ogawa, Kanagawa, all of Japan

[73] Assignee: Sony Corporation, Tokyo, Japan

[21] Appl. No.: 696,152

[22] Filed: Jan. 29, 1985

[30] Foreign Application Priority Data

Jan. 30, 1984 [JP] Japan ................... 59-15825

[51] Int. Cl.⁴ ........................... H04N 5/63; H04B 1/16
[52] U.S. Cl. ................... 358/190; 358/194.1; 455/343; 455/352; 307/64
[58] Field of Search ............... 358/194.1, 190; 455/352, 343, 151, 603; 307/18, 23, 44, 64, 85

[56] References Cited

U.S. PATENT DOCUMENTS

4,495,654 1/1985 Deiss ................... 358/194.1

Primary Examiner—Tommy P. Chin
Attorney, Agent, or Firm—Lewis H. Eslinger; Alvin Sinderbrand

[57] ABSTRACT

A switched power supply is connected to electronic circuitry the supply of power to which is to be controlled. An automatic switch enables the switched power supply selectively to energize or de-energize the electronic circuitry. A nominally continuous power supply is also provided, and a reset signal generator is connected thereto for generating a reset signal in response to a rising edge of an output voltage of the nominally continuous power supply following an interruption of the output voltage. A power switch is provided, together with a reset device actuated by the reset signal and a switching circuit controller connected to the automatic switch. A memory is connected to the switching circuit controller for memorizing the condition thereof and producing a memory output signal in response thereto. A detector detects the condition of the power switch and produces a detector output signal in response thereto. The switching circuit controller is connected to the reset device, the memory and the detector and generates a control signal for controlling the operation of the automatic switch in joint dependence on the memory output signal and the detector output signal when the reset device is actuated.

10 Claims, 5 Drawing Figures

APPARATUS FOR CONTROLLING POWER SUPPLY TO ELECTRONIC CIRCUITRY

BACKGROUND OF THE INVENTION

1. Field of the Invention

This invention relates to electronic control apparatus and, more particularly, to novel and highly-effective apparatus for controlling the power supply to electronic circuitry such as a television receiver.

2. Description of the Prior Art

It is common in many countries to equip a television receiver with a remote controller. To facilitate remote control, the television receiver incorporates a microcomputer powered selectively by a main power supply or a standby (backup) power supply. Despite the provision of a standby power supply, power interruptions can occur that, though too brief to be detected by the unaided senses, are capable nevertheless of placing the microcomputer in an abnormal operating state.

Various proposals in the prior art for remedying this problem have proved unsatisfactory because of increased manufacturing expense and inconvenience to users.

OBJECTS AND SUMMARY OF THE INVENTION

An object of the invention is to provide improved apparatus for controlling the power supply to electronic circuitry such as a television receiver.

Another object of the invention is to provide improved apparatus that can normalize the operation of an abnormally operating control microcomputer.

It is further object of the invention to provide improved apparatus for controlling the power supply to electronic circuitry including a television receiver that is controlled by a remote controller.

According to one aspect of the invention, there is provided apparatus for controlling the supply of power to electronic circuitry; the apparatus comprising: a switched power supply for connection to the electronic circuitry; automatic switch means enabling the switched power supply selectively to energize or deenergize the electronic circuitry; a nominally continuous power supply; reset signal generating means connected to the nominally continuous power supply for generating a reset signal in response to a rising edge of an output voltage of the nominally continuous power supply following an interruption of the output voltage; power switch means; reset means actuated by the reset signal; switching circuit control means connected to the automatic switch means; memory means connected to the switching circuit control means for memorizing the condition thereof and producing a memory output signal in response thereto; and detecting means for detecting the condition of the power switch means and producing a detector output signal in response thereto; the switching circuit control means being connected to the reset means, the memory means and the detecting means and generating a control signal for controlling the operation of the automatic switch means in joint dependence on the memory output signal and the detector output signal when the reset means is actuated.

BRIEF DESCRIPTION OF THE DRAWINGS

A better understanding of the objects, features and advantages of the invention can be gained from a consideration of the following detailed description of the preferred embodiment thereof, in conjunction with the appended drawing, wherein.

DESCRIPTION OF THE PREFERRED EMBODIMENT

Figure 1:
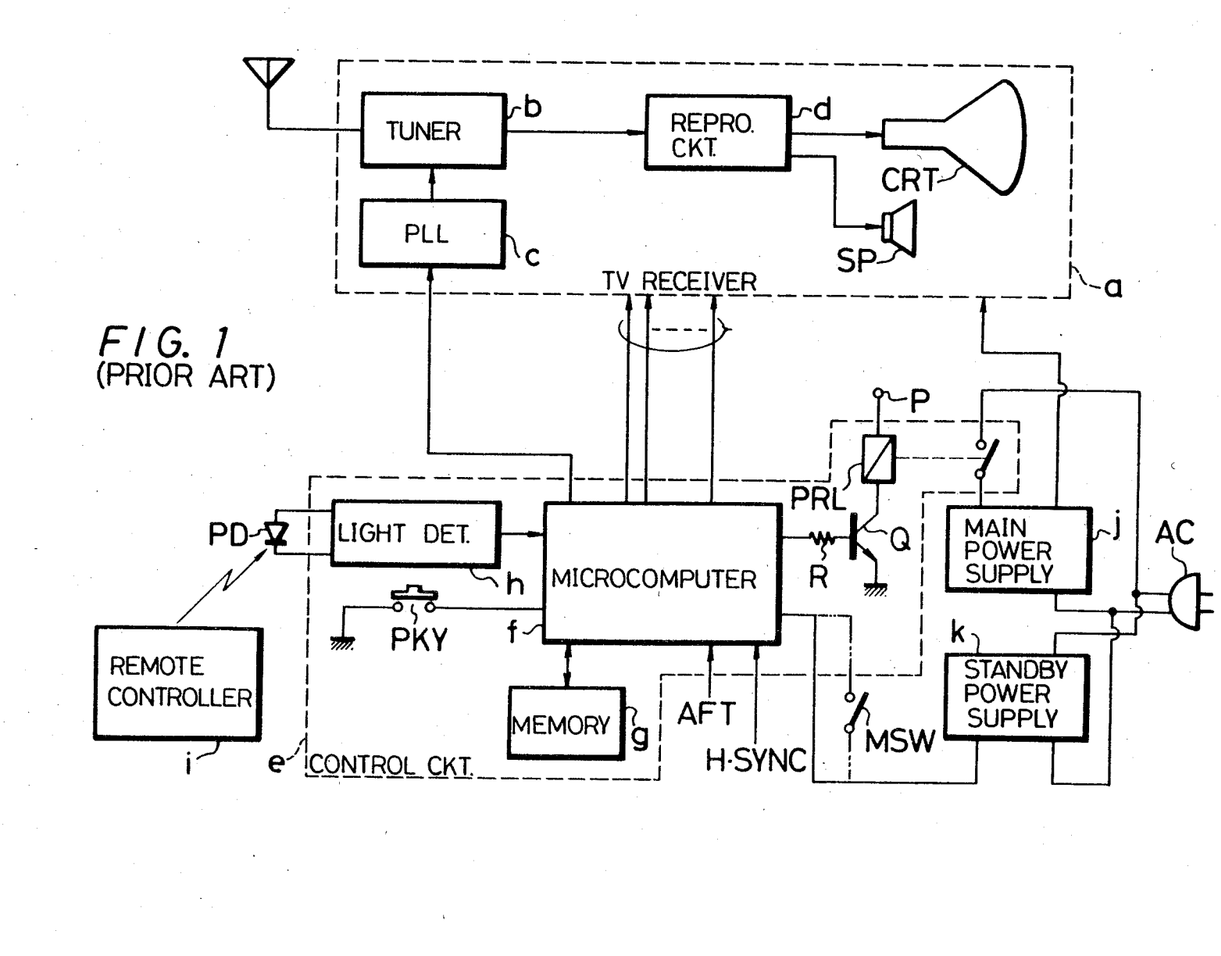
FIG. 1 is a circuit block diagram of conventional apparatus for controlling the power supply to electronic circuitry.

FIG. 1 shows a television receiver a and associated control apparatus typical of the prior art. The television receiver a receives a television signal and reproduces picture and sound. The television receiver a comprises a tuner b, a PLL (phase-locked loop) circuit c to control the tuner b, a reproducing circuit d, a cathode ray tube CRT and a speaker SP. A control circuit e controls the television receiver a and comprises a control microcomputer f, a memory g, and a light detector h which receives a remote control signal of infrared light rays (i.e. of electromagnetic radiation having a principal frequency component lying in the infrared region of the spectrum) from a remote controller i through a photo diode PD. A power supply key PKY is provided on the front panel of the housing (not shown) of the television receiver a. When the power supply key PKY is depressed or actuated, the microcomputer f produces a signal which reverses the on or off condition of a main power supply j for the television receiver a. This signal is supplied through a resistor R to the base of an NPN transistor Q the emitter of which is grounded. The collector of the transistor Q is connected to a power source terminal P through a power relay PRL which turns the main power supply j for the television receiver a on or off. A standby power supply k supplies a power voltage to the control microcomputer f.

When the remote controller i or the power supply key PKY is operated to turn the main power supply j on or off, the control microcomputer f decodes the resultant switching signal and produces a control signal which is supplied through the resistor R to the base of the transistor Q thereby to turn the power supply relay PRL on or off. Thus commercial power is supplied to the main power supply j or the supply of commercial power thereto is interrupted.

In such a television receiver, the microcomputer f frequently falls into an abnormal operating mode because of an instantaneous interruption of the commercial power supply (a service interruption of such short duration that it can not be perceived by the unaided senses). In case of such an interruption, a spurious signal may be supplied to the microcomputer f with the result that the microcomputer f is placed in an abnormal operating state. The construction and programming of the microcomputer may be such that, when a service interruption occurs, the microcomputer f is supposed to be reset. However, if the interruption is sufficiently brief, the microcomputer f may not be fully reset but may fall into an abnormal operating state. If the microcomputer f falls into an abnormal operating state, normal operation can not be depended upon to resume spontaneously. The microcomputer f may in fact fall into a more seriously defective operating state in which even the power supply can not be turned off in the usual manner. In such a case it becomes necessary to pull the AC plug from its socket momentarily and then reinsert it.

In the prior art, in order to deal with these problems, various proposals have been made, including the following: the characteristics of the power supply are improved so as to prevent the power supply voltage supplied to the microcomputer f from fluctuating abnormally even though an instantaneous service interruption occurs; the reset circuit is highly stabilized; the wiring pattern of the wiring circuit board is modified so as to prevent noise from entering into the microcomputer f; and the wiring material, the assembly parts and the like are coated with an appropriate shielding material. However, these proposals fall short of a complete solution to the problem and further cause a considerable increase in the manufacturing cost. Accordingly, when the microcomputer f falls into an abnormal operating condition, it may still be necessary to pull the plug from the AC socket momentarily and then insert it again in order to reestablish normal operation.

Therefore, in order that, when the microcomputer f falls into an abnormal operating condition, it can be reset instantly, it has been proposed that a master switch MSW be provided, as shown in FIG. 1 by a two-dot chain line, whereby the power voltage of the standby power supply k is supplied to the power supply terminal of the microcomputer f not directly but through the master switch MSW. Thus, in the worst case, the microcomputer f can be returned to the normal state by turning the master switch MSW off and on.

However, this technique requires the provision of an additional switch (the master switch MSW), and this causes an increase in cost that can not be neglected.

FIGS. 2-5 show apparatus according to the invention for controlling the power supply to electronic circuitry.

Figure 2:
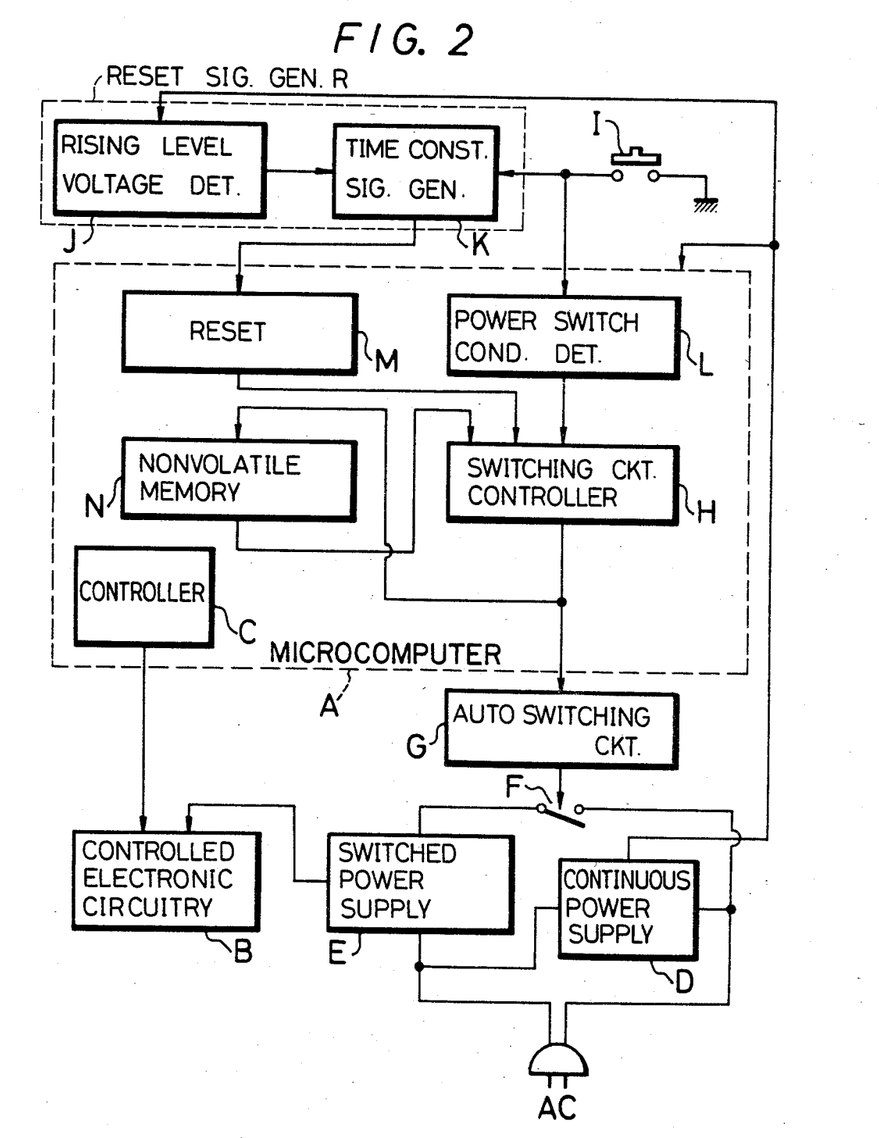
FIG. 2 is a circuit block diagram showing in broad outline a preferred embodiment of apparatus according to the invention for controlling the power supply to electronic circuitry.

FIG. 2 is a circuit block diagram showing the apparatus broadly. In FIG. 2, a microcomputer A controls circuitry B by means of a controller C incorporated in the microcomputer A. A power supply D which is nominally continuous but which can be interrupted by pulling an AC plug or by various malfunctions supplies power to the microcomputer A, and a switched power supply E supplies power to the controlled circuitry B.

Ideally, the nominally continuous power supply D is always supplied with commercial electrical power (house current) when the plug of an AC cord is properly inserted into a live socket. As indicated below, commercial electrical service may be interrupted so that the power supply D does not in fact operate continuously. The switched power supply E for the controlled circuitry B is selectively supplied with commercial electrical power (house current) through a make-break switch F. The switch F is controlled by an automatic switching circuit G, and the automatic switching circuit G is in turn controlled by a switching circuit controller H incorporated in the microcomputer A. The switched power supply E is turned on, namely placed in the state to produce a power supply voltage, or turned off, namely placed in the state not to produce a power supply voltage, by the microcomputer A and, more particularly, by the switching circuit controller H thereof.

A power switch I of non-latching type is provided for causing the microcomputer A to change the on or off condition of the switched power supply E. A rising level voltage detector J receives the power supply voltage derived from the nominally continuous power supply D and detects the rising edge of this voltage upon restoration of service after a service interruption, regardless of whether the service interruption is instantaneous or of extended duration. When the rising edge of the power supply voltage is thus detected, the rising level voltage detector J produces a pulse signal. A time-constant signal generator K generates a reset signal of a predetermined pulse width in response to actuation of the rising level voltage detector J or the power switch I. The rising level voltage detector J and time-constant signal generator K together constitute a reset signal generator R.

Detecting means L in the microcomputer A detects the condition of the power switch I, namely whether the power switch I is in the on or off state. Reset means M is actuated and resets the microcomputer A itself when the reset signal is produced by the reset signal generator R, whereby the program of the microcomputer A (disclosed below in connection with FIGS. 4 and 5) is restarted from its beginning.

A memory N memorizes the switching condition of the switching circuit controller H. The memory N is nonvolatile so that it continues to memorize, even upon an interruption of electrical power, the output contents of the switching circuit controller H prior to such interruption.

The switching circuit controller H is jointly responsive to the content of the memory N and the output of the detector L in order to control the automatic switch means comprising the make-break switch F and the switching circuit G.

More specifically, when the microcomputer A is reset, if the memorized contents of the memory N indicate that the switched power supply E for the controlled circuitry B was last in the "on" state, the power supply E for the circuitry B is switched to the state opposite to that of the power switch I. In other words, if the power switch I is turned on, the switched power supply E is turned off, while if the power switch I is turned off, the switched power supply E is turned on.

Similarly, after the microcomputer A is reset, if the memorized contents of the memory N indicate that the power supply was last in the "off" state, the switched power supply E for the controlled circuitry B is switched to the same state as that of the power switch I. In other words, if the power switch I is on, the switched power supply E is turned on, while if the power switch I is off, the switched power supply E is turned off.

Figure 3:
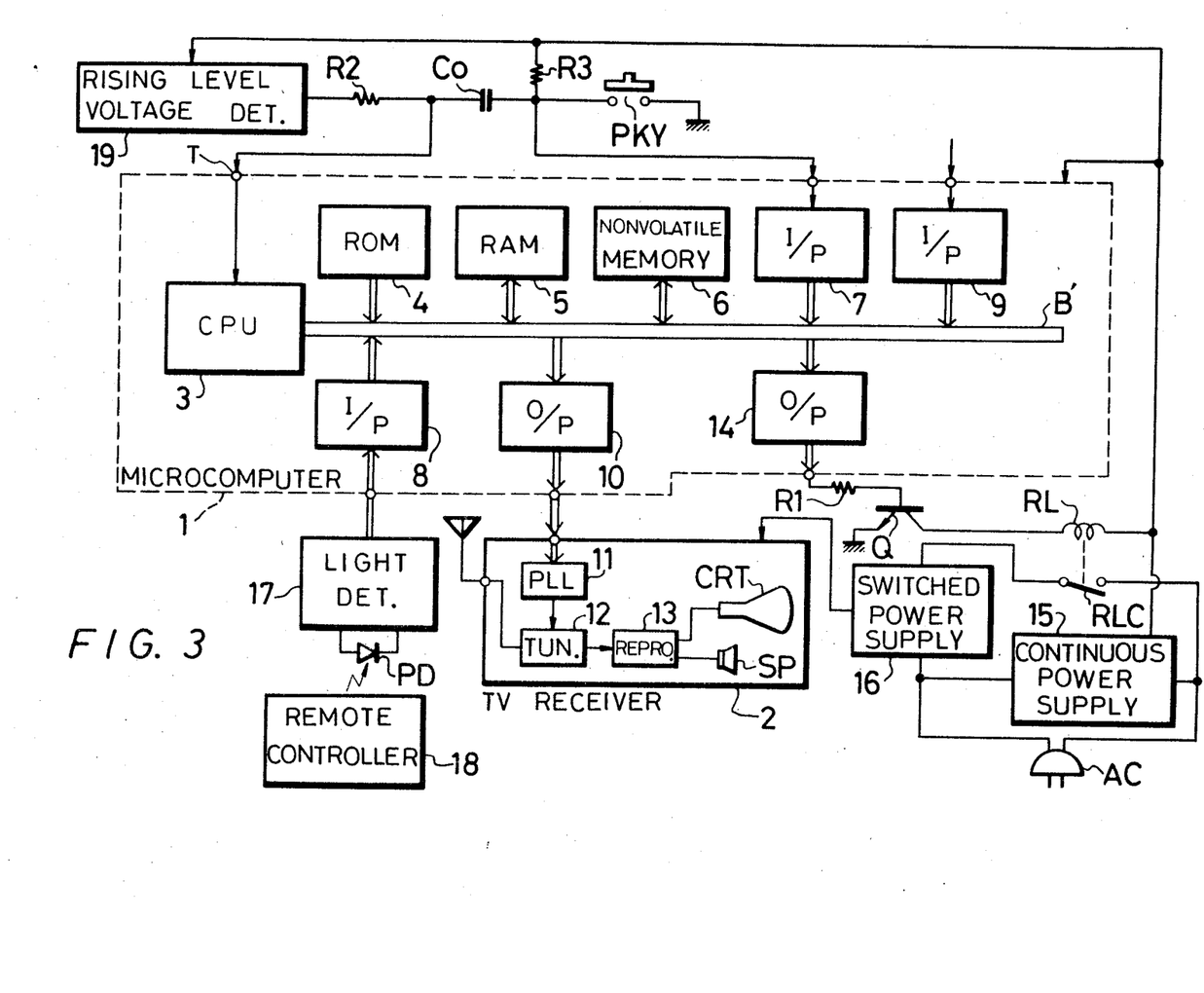
FIG. 3 is a circuit block diagram showing in greater detail a preferred embodiment of apparatus according to the invention.

FIG. 3 illustrates apparatus according to the invention in greater detail. In FIG. 3, a microcomputer 1 controls a television receiver 2 and comprises a central processing unit (CPU) 3, a read-only memory (ROM) 4, a random-access memory (RAM) 5, and a nonvolatile memory 6 which memorizes the on or off condition of the switched power supply 16 for the television receiver 2. An input port (I/P) 7 receives a switching signal from a power supply key PKY that is provided in, for example, the front panel of the housing (not shown) of the television receiver 2. An input port (I/P) 8 receives a signal from a light detector 17 incorporating a photo diode PD which responds to an infrared signal from a remote controller 18. An input port (I/P) 9 receives various other signals from sources not illustrated. An output port (O/P) 10 supplies a tuning signal to a phase-locked loop (PLL) circuit 11 incorporated in the television receiver 2. The tuning signal from the O/P 10 is supplied through the PLL circuit 11 to a tuner 12 that tunes in a broadcast electromagnetic signal corresponding to the tuning signal so that the broadcast signal is reproduced by a reproducing circuit 13 and then supplied to a cathode ray tube CRT and a speaker SP.

An output port (O/P) 14 produces a control signal which is supplied through a resistor R1 to the base of an NPN transistor Q of which the emitter is grounded. The collector of the transistor Q is connected through a relay RL to a power terminal of a nominally continuous power supply 15 for the microcomputer 1. A make-break switch contact RLC of the relay RL is interposed in a circuit which supplies commercial power from the continuous power supply 15 to a switched power supply 16. The switched power supply 16 provides power to the television receiver 2. The continuous power supply 15 for the microcomputer 1 is connected in parallel to an AC plug. There are no switches between the power supply 15 and the AC plug and, in the absence of a malfunction, the power supply voltage is therefore available at all times when the plug is properly inserted into a live socket. When the photo diode PD senses a remote-control signal of infrared rays (i.e. of electromagnetic radiation having a principal frequency component in the infrared region of the spectrum) emitted from the remote controller 18, the light detecting circuit 17 supplies the remote-control signal thus sensed to the I/P 8.

The ROM 4, RAM 5, memory 6, I/P's 7, 8 and 9 and O/P's 10 and 14 are all connected to the CPU 3 by a two-way bus B'.

A rising level voltage detector 19 detects the rising edge of the power supply voltage after a service interruption and produces a pulse signal in response thereto. The pulse signal is supplied through a resistor R2 to an input terminal T of the CPU 3 in order to reset the microcomputer 1 and to one side of a capacitor $C_0$. The side of the capacitor $C_0$ opposite the resistor R2 is connected to one terminal of the power key PKY. The other terminal of the power key PKY is connected to ground. A resistor R3 is connected between the connection point of the power key PKY and the capacitor $C_0$ and the power terminal of the continuous power supply 15 for the microcomputer 1.

During a period when the power key PKY is depressed or actuated, the switching signal supplied to the I/P 7 is held in a low level "L", since the input terminal of the I/P 7 is then grounded through the power key PKY. Each time the switching signal of level "L" is supplied to the I/P 7, the level of the switching signal delivered from the 0/P 14 is inverted from "L" to a high level "H" or from "H" to "L". At the same time, because of the grounding of the capacitor $C_0$ through the power key PKY, the terminal T of the microcomputer 1 is held at the "L" level during a period the length of which is determined by the time-constant of the RC circuitry R2, $C_0$ described above, which constitutes a time-constant signal generator. The time-constant signal generator and the rising level voltage detector 19 together constitute a reset signal generator. The period during which the terminal T is held at the "L" level is selected to be long enough that the microcomputer 1 is completely reset. In other words, not only when the restoration of power is detected by the rising level voltage detector 19 but also when the power key PKY is actuated, the microcomputer 1 is reliably placed in the reset state.

Figure 4:
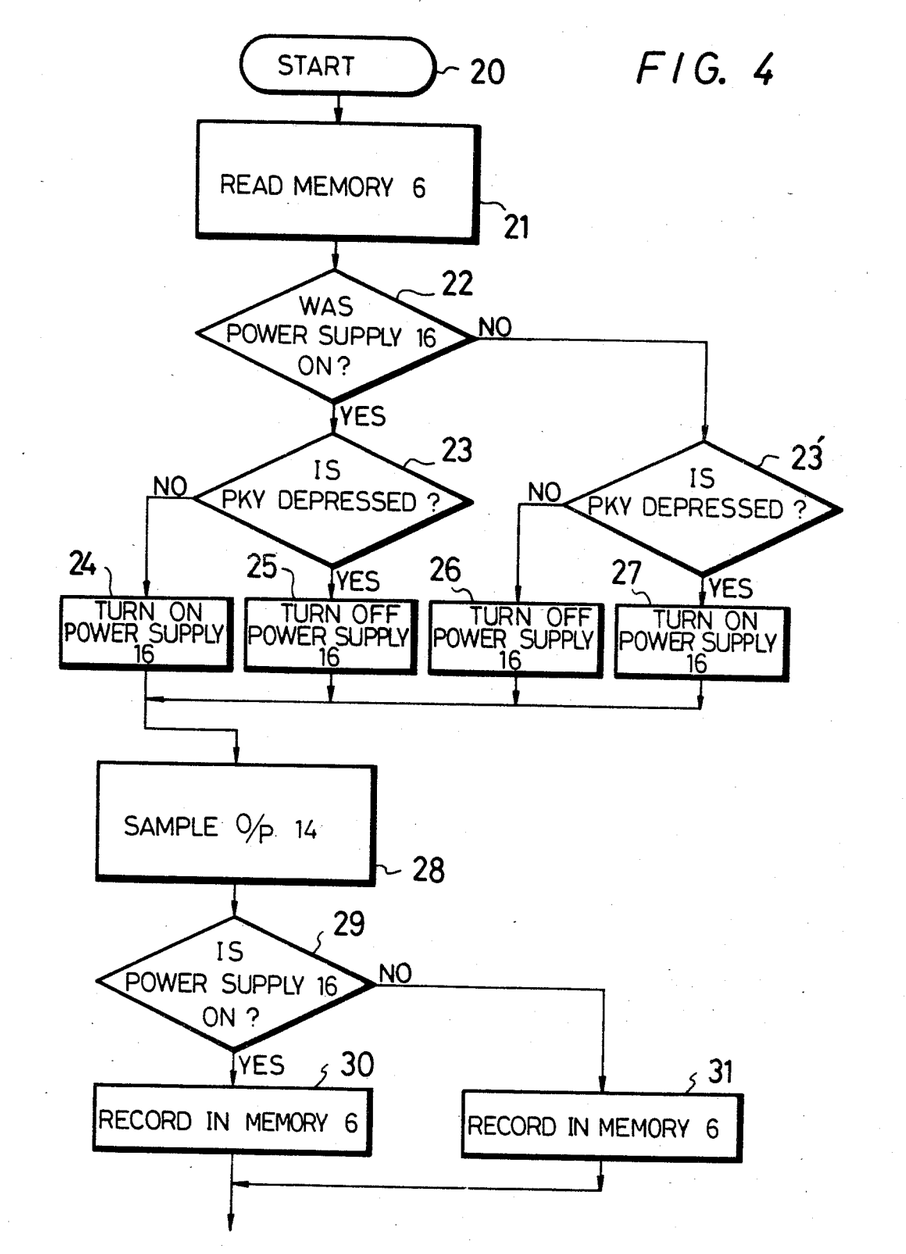
FIG. 4 is a flow chart of a program which is executed by a microcomputer in accordance with the invention.

The operation for turning on and off the switched power supply E (FIG. 2) or 16 (FIG. 3) for the controlled electronic circuitry B or television receiver 2 is shown in FIG. 4. FIG. 4 is a flow chart of a subroutine in a program executed by the microcomputer A (FIG. 2) or 1 (FIG. 3), but for simplicity the legends in FIG. 4 refer only to FIG. 3.

This subroutine begins with step 20 whenever the microcomputer A or 1 is reset. The microcomputer A or 1 is reset whenever the rising level voltage detector J or 19 generates a pulse signal or the power key I or PKY is depressed. The pulse signal is generated whenever voltage from the power supply D or 15 rises up (upon proper insertion of the AC plug into a live socket or upon restoration of service following an instantaneous or prolonged interruption of service).

At step 21, the contents of the nonvolatile memory N (FIG. 2) or 6 (FIG. 3) are read out. These contents register the on or off condition of the switched power supply E or 16 prior to the reset of the program subroutine to step 20. In other words, the nonvolatile memory N or 6 memorizes the on or off condition of the switched power supply E or 16, and even if a service interruption occurs, the memorized contents of the nonvolatile memory N or 6 are not lost. Accordingly, in the case of a service interruption, the on or off condition of the switched power supply E or 16 prior to the service interruption can be judged by reading out the contents of the nonvolatile memory N or 6.

At step 22 a determination is made (based on the contents of the memory N or 6 as read out at step 21) whether the switched power supply E or 16 was previously on.

At step 23 or 23' a determination is made whether or not the power key I (FIG. 2) or PKY (FIG. 3) is now depressed. Step 23 is executed when the determination made at step 22 is "YES", while step 23' is executed when the determination made at step 22 is "NO".

At step 24 the power supply E or 16 is turned on. Specifically, when the determination "NO" is made at step 23, a control signal is derived from the switching circuit controller H (FIG. 2) to control the operation of the automatic switch means comprising the switching circuit G and the make-break switch F or is derived from the O/P 14 (FIG. 3) to control the operation of the automatic switch means comprising the resistor R1, transistor Q, relay coil RL, and contact RLC. Specifically, in the case of FIG. 3, when the signal from the O/P 14 turns on the transistor Q, the relay coil RL is energized by the power supply 15 so that the contact piece RLC closes and commercial AC current is supplied to the switched power supply E or 16, turning it on. Accordingly, the television receiver 2 is also turned on.

At step 25 the switched power supply E or 16 is turned off. Specifically, when the determination "YES" is made at step 23, no switching signal is derived from the switching circuit controller H or O/P 14. As a result, the switched power supply E or 16 is supplied with no commercial AC current and hence is placed in the off state so that the controlled circuitry B or television receiver 2 is also turned off.

When the determination "NO" is made at step 23', the same operation of turning off the switched power supply E or 16 as at step 25 is carried out at step 26.

When the determination "YES" is made at step 23', the same operation of turning on the switched power supply E or 16 as at step 24 is carried out.

At step 28 the output of the switching circuit controller H or O/P 14 is sampled. When whichever one of steps 24 to 27 selected by the subroutine to be performed is ended, the on or off condition of the switched power supply E or 16 at present is therefore detected. Practically, this detection is carrier out by sampling the output of the switching circuit controller H or O/P 14: i.e., detecting whether or not the switching signal is produced.

At step 29 a determination is made whether or not the switched power supply E or 16 at present is turned on.

If the determination made at step 29 is "YES", then, at step 30 the on-state of the switched power supply E or 16 is recorded in the nonvolatile memory N or 6.

If the determination made at step 29 is "NO", then, at step 31 the off-state of the switched power supply E or 16 is recorded in the nonvolatile memory N or 6.

When the power supply voltage rises up after the end of a service interruption or the power key I or PKY provided in a panel of the housing of the controlled circuitry B or television receiver 2 is depressed or actuated, the microcomputer A or 1 is placed in the reset state. When the microcomputer A or 1 is reset by the rising up of the power supply voltage, so long as the power key I or PKY is not depressed, the switched power supply E or 16 is operated to return the controlled circuitry B or television receiver 2 to its on or off state as it existed just before the service interruption. However, when the power key I or PKY is depressed while the power supply E or 16 and controlled circuitry B or television receiver 2 are turned on, the switched power supply E or 16 and the controlled circuitry B or television receiver 2 are turned off.

Alternatively, when the microcomputer A or 1 is reset by the operation of the power key I or PKY, the switched power supply E or 16 is turned on if it was previously off and is turned off if it was previously on.

Consequently, regardless of whether or not the service interruption is a momentary one, the microcomputer A or 1 is automatically reset immediately after the end of the service interruption. Furthermore, even if abnormal operation of the microcomputer A or 1 should occur for any reason, normal operation can be restored by use of the power key I or PKY.

Figure 5:
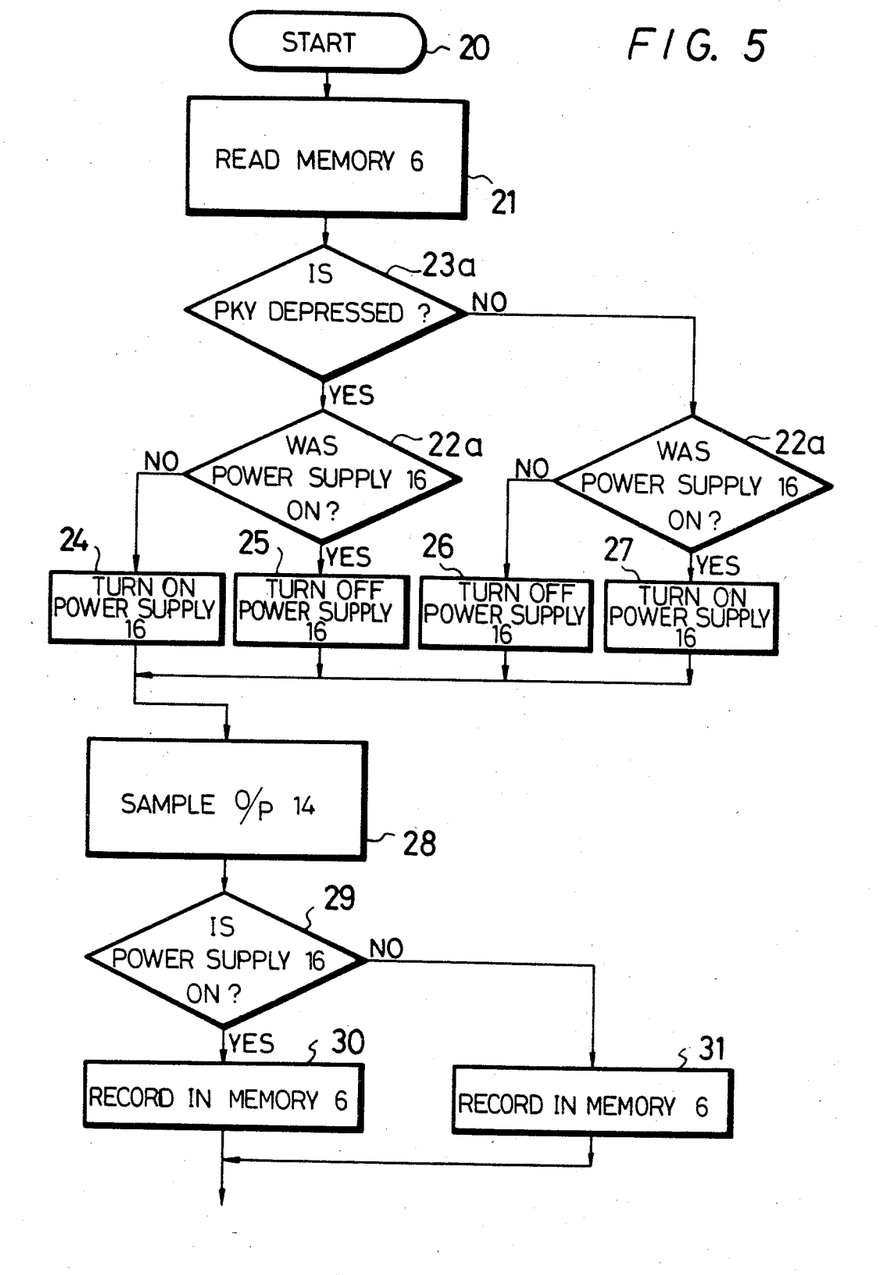
FIG. 5 is a flow chart of a modification of the program shown in FIG. 4.

FIG. 5 is a flow chart of a modified program for the microcomputer A or 1. This program is different from the program shown in FIG. 4 only in that the sequential order of determining whether or not the power supply E or 16 was previously turned on, and determining whether or not the power key I or PKY is now depressed, is reversed.

Thus at step 23a in FIG. 5 a determination is made whether or not the power key I or PKY is now depressed. At step 22a or 22a' a determination is made based on the contents of the memory N or 6 as read out at step 21 whether the switched power supply E or 16 was previously on. Step 22a is executed when the determination made at step 23a is "YES", while step 22a' is executed when the determination made at step 23a is "NO". Accordingly, both of the programs shown in FIGS. 4 and 5 serve the same ultimate purposes.

As set forth above, according to this invention, should the microcomputer A or 1 fall into an abnormal operating state, it can be reset by operating the power supply switch I or PKY. Accordingly, it is not necessary to provide a separate master switch MSW (FIG. 1) for turning off the switched power supply E or 16 in order to reset the microcomputer, nor is it necessary to remove the AC plug and reinsert it.

From the description of a preferred embodiment of the invention, it is apparent that many modifications and variations can be effected by one skilled in the art without departing from the spirit or scope of the invention. The scope of the invention is therefore to be determined only by the appended claims.

We claim as our invention:

1. Apparatus for controlling the supply of power to electronic circuitry; said apparatus comprising:
   a switched power supply for connection to said electronic circuitry;
   automatic switch means enabling said switched power supply selectively to energize or de-energize said electronic circuitry;
   a nominally continuous power supply;
   reset signal generating means connected to said nominally continuous power supply for generating a reset signal in response to a rising edge of an output voltage of said nominally continuous power supply following an interruption of said output voltage;
   power switch means;
   reset means actuated by said reset signal;
   switching circuit control means connected to said automatic switch means;
   memory means connected to said switching circuit control means for memorizing the condition thereof and producing a memory output signal in response thereto; and
   detecting means for detecting the condition of said power switch means and producing a detector output signal in response thereto;
   said switching circuit control means being connected to said reset means, said memory means and said detecting means and generating a control signal for controlling the operation of said automatic switch means in joint dependence on said memory output signal and said detector output signal when said reset means is actuated.

2. Apparatus according to claim 1; wherein, when said reset means is actuated:
   said switching circuit control means turns off said automatic switch means (a) when said memory output signal indicates an on condition of said switching circuit control means and said detector output signal indicates an on condition of said power switch means or (b) when said memory output signal indicates an off condition of said switching circuit control means and said detector output signal indicates an off condition of said power switch means; and
   said switching circuit control means turns on said automatic switch means (c) when said memory output signal indicates an off condition of said switching circuit control means and said detector output signal indicates an on condition of said power switch means or (d) when said memory output signal indicates an on condition of said switching circuit control means and said detector output signal indicates an off condition of said power switch means.

3. Apparatus according to claim 1; wherein said power switch means is connected to said reset signal generating means for selectively actuating said reset signal generating means to produce said reset signal.

4. Apparatus according to claim 1; wherein said memory means is nonvolatile.

5. Apparatus according to claim 1; further comprising microcomputer means; said reset means, said switching circuit control means, said memory means and said detecting means being incorporated therein and said reset means resetting said microcomputer means in response to said reset signal, whereby said microcomputer means is prevented from falling into an abnormal operating state upon interruption and restoration of said output voltage.

6. Apparatus according to claim 1; further comprising means for connecting said switched power supply and said nominally continuous power supply to the same AC power source.

7. Apparatus according to claim 1; wherein said automatic switch means comprises a make-break switch, a relay coil controlling the condition of said make-break switch in response to current flowing through said relay coil, and a transistor controlling current flowing through said relay coil in response to said control signal.

8. Apparatus according to claim 1; further comprising means for generating a remote-control signal and remote-control signal receiving means connected to said electronic circuitry for controlling said electronic circuitry in response to said remote control signal.

9. Apparatus according to claim 8; wherein said remote control signal is an electromagnetic signal having a principal frequency component in the infrared region of the electromagnetic spectrum.

10. Apparatus according to claim 1; wherein said electronic circuitry comprises a television receiver.

* * * * *